(12) United States Patent
Ogue et al.

(10) Patent No.: US 11,170,913 B2
(45) Date of Patent: Nov. 9, 2021

(54) WATERPROOFING STRUCTURE AND WATERPROOFING METHOD FOR SHIELDED CABLE

(71) Applicant: Yazaki Corporation, Tokyo (JP)

(72) Inventors: Takeshi Ogue, Shizuoka (JP); Hideomi Adachi, Shizuoka (JP); Masahide Tsuru, Shizuoka (JP); Hiroyuki Yoshida, Shizuoka (JP); Kenta Yanazawa, Shizuoka (JP); Toshihiro Nagashima, Shizuoka (JP); Tetsuo Yamada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/159,973

(22) Filed: Oct. 15, 2018

(65) Prior Publication Data

US 2019/0115121 A1    Apr. 18, 2019

(30) Foreign Application Priority Data

Oct. 16, 2017    (JP) ............................. JP2017-200160

(51) Int. Cl.
*H01B 7/282*    (2006.01)
*H01R 13/52*    (2006.01)
(Continued)

(52) U.S. Cl.
CPC ....... *H01B 7/2825* (2013.01); *B60R 16/0215* (2013.01); *H01B 7/0045* (2013.01);
(Continued)

(58) Field of Classification Search
CPC ........ H01B 7/2825; H01B 7/285; H01B 7/02; H01B 9/024; H01B 13/0036
See application file for complete search history.

(56) References Cited

U.S. PATENT DOCUMENTS 5,378,995 A * 1/1995 Kudo .................... G01M 3/165
174/11 R
5,796,042 A * 8/1998 Pope ...................... H01B 7/288
174/102 SP
(Continued)

FOREIGN PATENT DOCUMENTS

CN    101038800 A    9/2007
CN    104103934 A    10/2014
(Continued)

*Primary Examiner* — Timothy J Thompson
*Assistant Examiner* — Rhadames Alonzo Miller
(74) *Attorney, Agent, or Firm* — Sughrue Mion, PLLC

(57) ABSTRACT

A waterproofing structure for shielded cable includes: a shielded cable including one or more cables and a braided wire serving as a shielding member and covering the cables; a grommet serving as a waterproofing member and covering a waterproofed portion on the braided wire; and a heat shrinkable tube including an adhesive disposed to cover the waterproofed portion of the braided wire 13. The adhesive pushed into the braided wire by heat shrinkage of the heat shrinkable tube fills a gap between a plurality of strands of the braided wire in an entire region of the waterproofed portion and a gap between the cable and the braided wire. A space between an outer circumferential surface of the heat shrinkable tube and a part of an inner circumferential surface of the waterproofing member is blocked without any gap in a circumferential direction.

7 Claims, 7 Drawing Sheets

(51) Int. Cl.
  *B60R 16/02* (2006.01)
  *H02G 3/04* (2006.01)
  *H01B 7/00* (2006.01)
  *H02G 15/04* (2006.01)
  *H02G 15/013* (2006.01)

(52) U.S. Cl.
  CPC ....... *H01R 13/5205* (2013.01); *H02G 3/0462* (2013.01); *H02G 3/0487* (2013.01); *H02G 15/013* (2013.01); *H02G 15/04* (2013.01)

(56) References Cited

U.S. PATENT DOCUMENTS

| | | | | |
|---|---|---|---|---|
| 5,949,018 | A * | 9/1999 | Esker | H01B 7/288 |
| | | | | 174/106 R |
| 6,293,080 | B1 * | 9/2001 | Nishihara | D02G 3/404 |
| | | | | 57/200 |
| 7,001,423 | B2 * | 2/2006 | Euteneuer | A61F 2/95 |
| | | | | 606/198 |
| 9,875,824 | B2 | 1/2018 | Oga et al. | |
| 2001/0032734 | A1 * | 10/2001 | Madry | H01B 7/288 |
| | | | | 174/121 R |
| 2007/0215374 | A1 * | 9/2007 | Ichikawa | H01R 4/72 |
| | | | | 174/75 C |
| 2009/0194315 | A1 * | 8/2009 | Van Der Meer | H01B 7/2855 |
| | | | | 174/116 |
| 2010/0210745 | A1 * | 8/2010 | McDaniel | C09D 5/008 |
| | | | | 521/55 |
| 2012/0000690 | A1 * | 1/2012 | Van Der Meer | H01B 7/2825 |
| | | | | 174/102 R |
| 2014/0305678 | A1 * | 10/2014 | Fukuda | H01B 7/2825 |
| | | | | 174/11 OR |
| 2016/0148722 | A1 * | 5/2016 | Hagi | H02G 3/0468 |
| | | | | 174/128.1 |
| 2016/0189828 | A1 * | 6/2016 | Oga | B60R 16/0215 |
| | | | | 174/72 A |

FOREIGN PATENT DOCUMENTS

| | | |
|---|---|---|
| CN | 105655017 A | 6/2016 |
| JP | 2015-32464 A | 2/2015 |
| JP | 2016-119821 A | 6/2016 |

* cited by examiner

WATERPROOFING STRUCTURE AND WATERPROOFING METHOD FOR SHIELDED CABLE

CROSS REFERENCE TO RELATED APPLICATION

The present application is based on, and claims priority from Japanese Patent Application No. 2017-200160, filed Oct. 16, 2017, the disclosure of which is hereby incorporated by reference herein in its entirety.

TECHNICAL FIELD

The present application relates to a waterproofing structure and a waterproofing method for shielded cable to be used for power feeding, wiring, and the like of various vehicles such as a hybrid electric vehicle (HEV) and an electric vehicle (EV).

BACKGROUND

This type of a conventional example of a waterproofing structure for a shielded cable is disclosed in U.S. Pat. No. 9,875,824 B2. As illustrated in FIGS. 11 and 12, in a conventional waterproofing structure 2 of a shielded cable 1, only waterproofed portions of the shielded cable 1 (portions facing an elliptic cylindrical small-diameter cylindrical portion 7a of a grommet 7) are partially water-stopped. The shielded cable 1 includes two coated cables 3, a braided wire 4 as a shielding member counteracting electromagnetic waves covering the two coated cables 3, and a rubber waterproofing plug 5 that covers the waterproofed portion of the two coated cables 3.

The waterproofing structure 2 of the shielded cable 1 has a configuration in which the braided meshes 4a of the braided wire 4 for covering the rubber waterproofing plug 5 is filled with an adhesive 6 and this portion is brought into close contact with a rubber grommet 7 by the elastic force of the elliptic cylindrical small-diameter cylindrical portion 7a, thereby preventing infiltration of water from the outside of the vehicle compartment on the side of the elliptic cylindrical small-diameter cylindrical portion 7a of the grommet 7 to the inside of the vehicle compartment on the side of the cylindrical large-diameter cylindrical portion 7b of the grommet 7.

SUMMARY

In the conventional waterproofing structure 2 of the shielded cable 1, the rubber waterproofing plug 5 for covering the waterproofed portion of the two coated cables 3 is indispensable. Thus, the number of parts and man-hours are increased to result in high cost, and the structure is made complicated and heavier.

The present application is made to solve the above problems, and has an object to provide a waterproofing structure and a waterproofing method for a shielded cable, in which it is possible to reduce the number of parts and man-hours to reduce cost and to make the whole structure more compact and lighter.

A waterproofing structure for shielded cable according to a first aspect of the present application includes: a shielded cable including one or more cables and a braided wire serving as a shielding member configured to cover the cables; a waterproofing member covering a waterproofed portion on the braided wire; and a heat shrinkable tube including a waterproofing filler disposed to cover a waterproofed portion of the braided wire. The waterproofing filler pushed into the braided wire by heat shrinkage of the heat shrinkable tube fills gaps between a plurality of strands of the braided wire in an entire region of the waterproofed portion and a gap between the cable and the braided wire. A space between an outer circumferential surface of the heat shrinkable tube and a part of an inner circumferential surface of the waterproofing member is blocked without any gap in a circumferential direction.

A waterproofing method for shielded cable according to a second aspect of the present application includes: when covering a waterproofed portion of a shielded cable including one or more cables and a braided wire serving as a shielding member configured to cover the cables with a waterproofing member; covering the braided wire in a waterproofed portion on the shielded cable with a heat shrinkable tube including a waterproofing filler; filling gaps between a plurality of strands of the braided wire in an entire region of the waterproofed portion and a gap between the cable and the braided wire with the waterproofing filler by pushing the waterproofing filler into the braided wire by heating the heat shrinkable tube to shrink; and bringing an outer surface of the heat shrinkable tube in the waterproofed portion filled with the waterproofing filler into close contact with a part of an inner surface of the waterproofing member without any gap in a circumferential direction.

With the waterproofing structure for shielded cable according to the first aspect of the present application and the waterproofing method for shielded cable according to the second aspect of the present application, it is only necessary to fill the gaps between the plurality of strands of the braided wire in the entire region of the waterproofed portion and the gap between the cable and the braided wire with the waterproofing filler by the heat shrinkage of the heat shrinkable tube. Thus, it is possible to reduce the number of parts and man-hours to reduce cost, and to make the whole structure more compact and lighter.

DESCRIPTION OF EMBODIMENTS

Hereinafter, embodiments will be described with reference to the drawings.

First Embodiment

Figure 1:
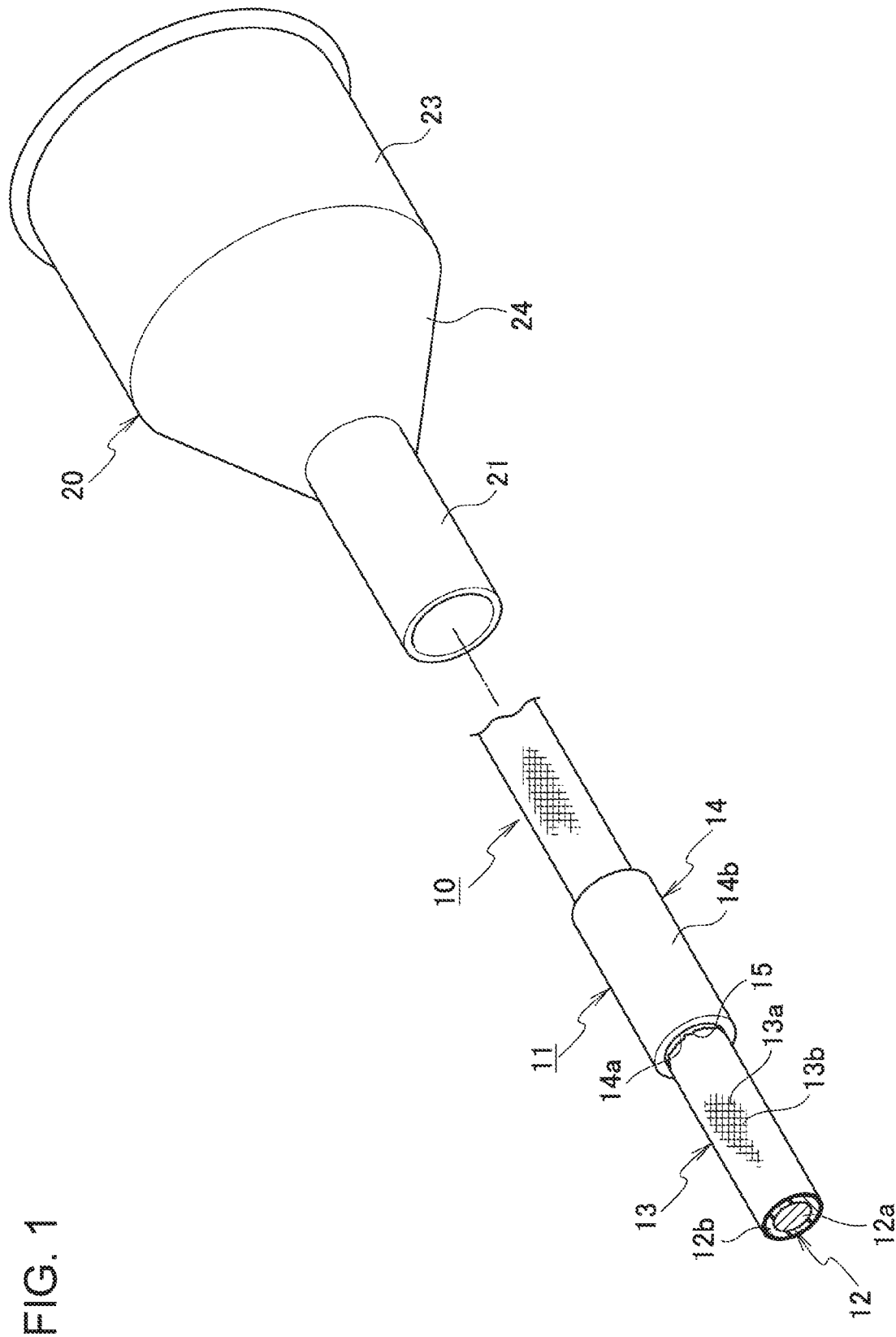
FIG. 1 is an exploded perspective view of a waterproofing structure for a shielded cable according to a first embodiment.
Figure 2:
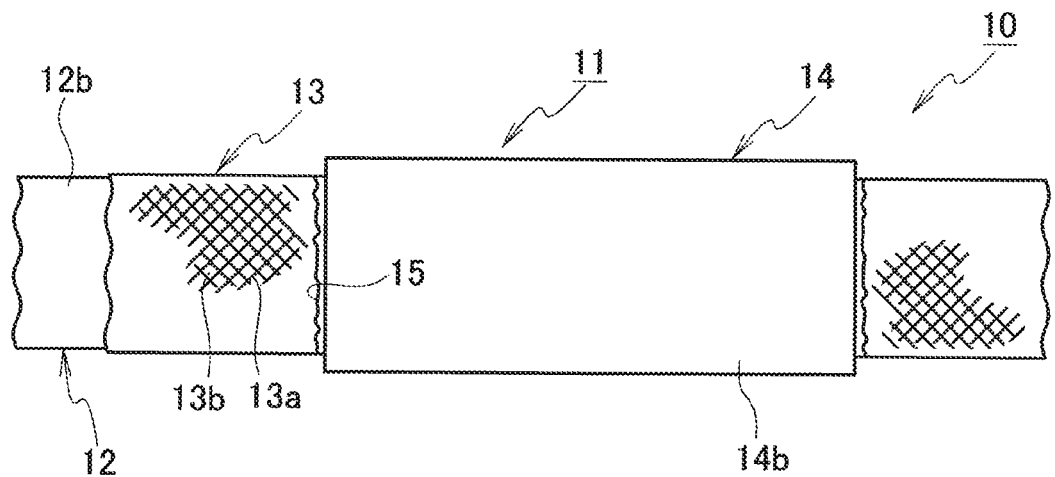
FIG. 2 is a plan view of a main portion of the waterproofing structure for the shielded cable in FIG. 1.
Figure 3:
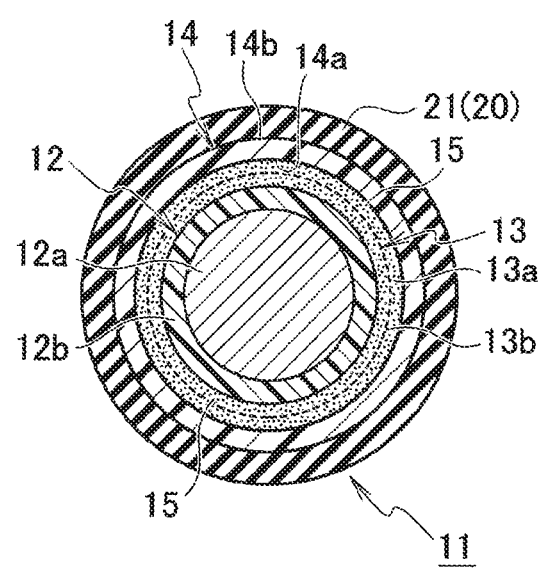
FIG. 3 is a cross-sectional view of the waterproofing structure for the shielded cable in FIG. 1.

With reference to FIGS. 1 to 3, a waterproofing structure for a shielded cable according to a first embodiment will be described.

As illustrated in FIGS. 1 and 2, in the first embodiment, a shielded cable 10 includes a coated cable 12 and a conductive and tubular braided wire 13 as a shielding member for covering the coated cable 12, and has a sheathless structure in which the outside of the braided wire 13 is not covered with an insulating sheath. The shielded cable 10 is used as a harness for low voltage for power feeding, wiring, and the like of various vehicles such as a hybrid electric vehicle (HEV) and an electric vehicle (EV), for example.

The waterproofing structure 11 for the shielded cable 10 according to the first embodiment includes a shielded cable 10 having a part (e.g. a portion where there is a risk of infiltration based on past infiltration cases) that is subjected to waterproofing treatment and a rubber grommet 20 as a waterproofing member for covering a waterproofed portion of the braided wire 13 of the shielded cable 10.

More specifically, as illustrated in FIGS. 1 and 2, the coated cable 12 includes a core wire 12a at the center and an insulating coating 12b that is formed of an insulator such as an insulating resin and covers the outer periphery of the core wire 12a. On the outer side of the waterproofed portion (a portion facing a small-diameter cylindrical portion 21 of the grommet 20) of the braided wire 13 for covering the coated cable 12, a heat shrinkable tube 14 including pasty adhesive 15 applied to the inner circumferential surface 14a as a waterproofing filler is disposed so as to surround the waterproofed portion of the braided wire 13.

Then, as illustrated in FIGS. 1 to 3, the adhesive 15 pushed into the braided wire 13 by the heat shrinkable tube 14 heat-shrunk by being heated to a predetermined temperature reliably permeates and fills gaps 13b between a plurality of strands 13a of the braided wire 13 in the entire region of the waterproofed portion and a gap between the coated cable 12 and the plurality of strands 13a of the braided wire 13, and each of the above-described gaps is blocked.

The braided wire 13 is a shielding member counteracting electromagnetic waves. The braided wire 13 is formed by braiding a plurality of conductive strands 13a into a tubular shape to shield an electromagnetic noise. The grommet 20 includes the small-diameter cylindrical portion 21 having a cylindrical shape, a large-diameter cylindrical portion 23 having a cylindrical shape, and an intermediate portion 24 having a conical cylindrical shape and connecting the small-diameter cylindrical portion 21 and the large-diameter cylindrical portion 23. A space between the outer circumferential surface 14b of the heat-shrunk heat shrinkable tube 14 and the inner circumferential surface of the small-diameter cylindrical portion 21 is blocked without any gap by a lip portion (not illustrated) that is formed integrally with the small-diameter cylindrical portion 21 to project from the inner circumferential surface of the small-diameter cylindrical portion 21. Then, the waterproofing structure 11 for the shielded cable 10 according to the first embodiment prevents infiltration of water from the outside of the vehicle compartment on the side of the small-diameter cylindrical portion 21 of the grommet 20 to the inside of the vehicle compartment on the side of the large-diameter cylindrical portion 23 of the grommet 20.

In the waterproofing structure 11 for the shielded cable 10 according to the first embodiment, when the waterproofed portion of the shielded cable 10 including the coated cable 12 and the tubular braided wire 13 as a shielding member for covering the coated cable 12 is covered with the small-diameter cylindrical portion 21, first, the heat shrinkable tube 14 including the pasty adhesive 15 applied to the inner circumferential surface 14a is disposed on the outer side of the braided wire 13 in the waterproofed portion of the shielded cable 10 by inserting the braided wire 13. Next, the heat shrinkable tube 14 is heated and heat-shrunk to push the adhesive 15 applied to the inner circumferential surface 14a of the heat shrinkable tube 14 into each of the gaps 13b between the plurality of strands 13a of the braided wire 13 in the entire region of the waterproofed portion and the gap between the coated cable 12 and the plurality of strands 13a of the braided wire 13 to reliably fill each of the gaps, and the inner circumferential surface of the small-diameter cylindrical portion 21 is pressed against the outer circumferential surface 14b of the heat shrinkable tube 14 heat-shrunk by the elastic force of the small-diameter cylindrical portion 21 to achieve sealing, whereby the waterproofing structure 11 for the shielded cable 10 is manufactured. This can easily and reliably prevent infiltration of water from the outside of the vehicle compartment on the side of the small-diameter cylindrical portion 21 of the grommet 20 to the inside of the vehicle compartment on the side of the large-diameter cylindrical portion 23 of the grommet 20.

The waterproofing structure 11 for the shielded cable 10 according to the first embodiment only has to push the adhesive 15 by heat shrinkage of the heat shrinkable tube 14 into and fill the gaps 13b between the plurality of strands 13a of the braided wire 13 in the entire region of the waterproofed portion and the gap between the coated cable 12 and the plurality of strands 13a of the braided wire 13, without using a part such as a rubber waterproofing plug as in the conventional example. Therefore, the waterproofing structure 11 for the shielded cable 10 according to the first embodiment enables to reduce the number of parts and man-hours to reduce cost, and to make the whole structure more compact and lighter.

Second Embodiment

Figure 4:
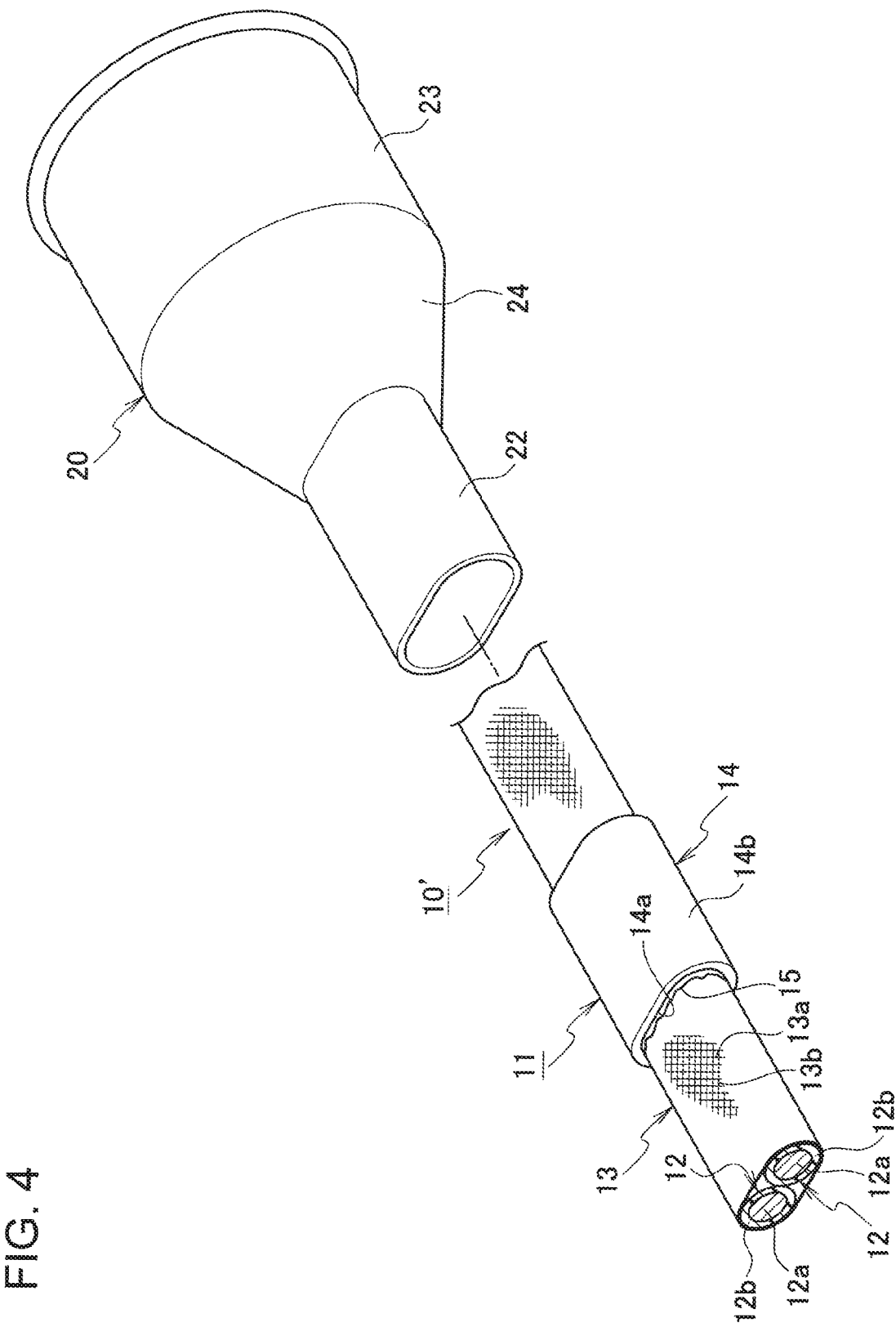
FIG. 4 is an exploded perspective view of a waterproofing structure for a shielded cable according to a second embodiment.
Figure 5:
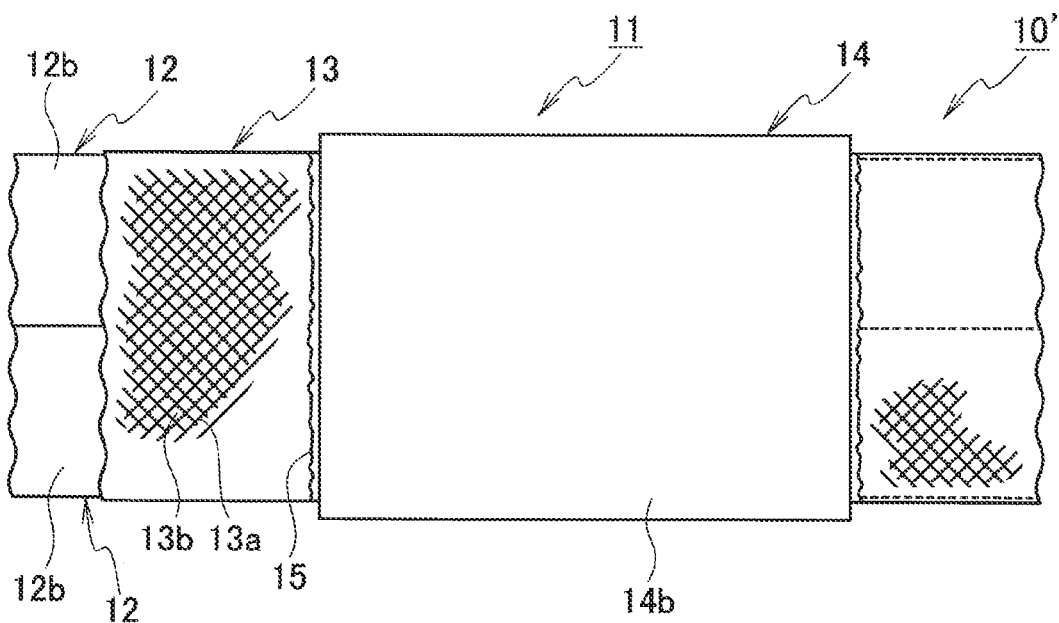
FIG. 5 is a plan view of a main portion of the waterproofing structure for the shielded cable in FIG. 4.
Figure 6:
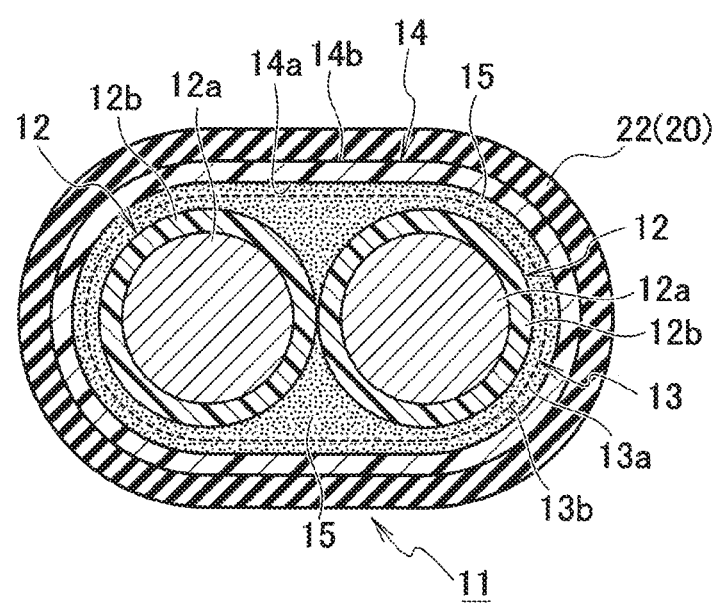
FIG. 6 is a cross-sectional view of the waterproofing structure for the shielded cable in FIG. 4.

With reference to FIGS. 4 to 6, a waterproofing structure for a shielded cable according to a second embodiment will be described.

As illustrated in FIGS. 4 and 5, in the second embodiment, a shielded cable 10' includes two coated cables 12 and a conductive and tubular braided wire 13 as a shielding member for collectively covering the two coated cables 12, and has a sheathless structure in which the outside of the braided wire 13 is not covered with an insulating sheath. The shielded cable 10' is used, for example, as a harness for high voltage for power feeding, wiring, and the like of various vehicles such as an HEV and an EV. In the first embodiment, the coated cable 12 is used, whereas in the second embodiment, the two coated cables 12 are used, which is a big difference.

The waterproofing structure 11 for the shielded cable 10' according to the second embodiment includes a shielded cable 10' having a part (e.g. a portion where there is a risk of infiltration based on past infiltration cases) that is subjected to waterproofing treatment and a rubber grommet 20 as a waterproofing member for covering a waterproofed portion of the braided wire 13 of the shielded cable 10'.

More specifically, as illustrated in FIGS. 4 and 5, each of the coated cables 12 includes a core wire 12a at the center and an insulating coating 12b that is formed of an insulator such as an insulating resin and covers the outer periphery of the core wire 12a. On the outer side of the waterproofed portion (a portion facing a small-diameter cylindrical portion 22 of the grommet 20) of the braided wire 13 for collectively covering the two coated cables 12, a heat shrinkable tube 14 including pasty adhesive 15 applied to the inner circumferential surface 14a as a waterproofing filler is disposed to surround the waterproofed portion of the braided wire 13.

Then, as illustrated in FIGS. 4 and 6, the adhesive 15 pushed into the braided wire 13 by the heat shrinkable tube 14 that is heat-shrunk by being heated to a predetermined temperature reliably permeates and fills the gaps 13b between the plurality of strands 13a of the braided wire 13, the gap between the coated cables 12 and the plurality of strands 13a of the braided wire 13, and the gaps between the two coated cables 12, in the entire region of the waterproofed portion, and each of the gaps described above is blocked.

The grommet 20 includes the small-diameter cylindrical portion 22 having an elliptic cylindrical shape, a large-diameter cylindrical portion 23 having a cylindrical shape, and an intermediate portion 24 having a conical cylindrical shape and connecting the small-diameter cylindrical portion 22 and the large-diameter cylindrical portion 23. A space between the outer circumferential surface of the heat-shrunk heat shrinkable tube 14 and the inner circumferential surface of the small-diameter cylindrical portion 22 is blocked without any gap by a lip portion (not illustrated) that is formed integrally with the inner circumferential surface of the small-diameter cylindrical portion 22 to project from the inner circumferential surface of the small-diameter cylindrical portion 22. Then, the waterproofing structure 11 for the shielded cable 10' according to the second embodiment prevents infiltration of water from the outside of the vehicle compartment on the side of the small-diameter cylindrical portion 22 of the grommet 20 to the inside of the vehicle compartment on the side of the large-diameter cylindrical portion 23 of the grommet 20.

In the waterproofing structure 11 for the shielded cable 10' according to the second embodiment, when the waterproofed portion of the shielded cable 10' including the two coated cables 12 and the tubular braided wire 13 as a shielding member for covering the two coated cables 12 is covered with the small-diameter cylindrical portion 22, first, the heat shrinkable tube 14 including the pasty adhesive 15 applied to the inner circumferential surface 14a is disposed on the outer side of the braided wire 13 in the waterproofed portion of the shielded cable 10' by inserting the braided wire 13. Next, the heat shrinkable tube 14 is heated and heat-shrunk to push the adhesive 15 applied to the inner circumferential surface 14a of the heat shrinkable tube 14 into the gaps 13b between the plurality of strands 13a of the braided wire 13 in the entire region of the waterproofed portion, the gap between the coated cables 12 and the plurality of strands 13a of the braided wire 13, and the gaps between the two coated cables 12 to reliably fill each of the gaps, and the inner circumferential surface of the small-diameter cylindrical portion 22 is pressed against the outer circumferential surface 14b of the heat shrinkable tube 14 heat-shrunk by the elastic force of the small-diameter cylindrical portion 22 to achieve sealing, whereby the waterproofing structure 11 for the shielded cable 10' is manufactured. This can easily and reliably prevent infiltration of water from the outside of the vehicle compartment on the side of the small-diameter cylindrical portion 22 of the grommet 20 to the inside of the vehicle compartment on the side of the large-diameter cylindrical portion 23 of the grommet 20.

The waterproofing structure 11 for the shielded cable 10' according to the second embodiment only has to push the adhesive 15 by heat shrinkage of the heat shrinkable tube 14 into and fill the gaps 13b between the plurality of strands 13a of the braided wire 13 in the entire region of the waterproofed portion, the gap between the coated cables 12 and the plurality of strands 13a of the braided wire 13, and the gaps between the two coated cables 12, without using a part such as a rubber waterproofing plug as in the conventional example. Therefore, the waterproofing structure 11 for the shielded cable 10' according to the second embodiment enables to reduce the number of parts and man-hours to reduce cost, and to make the whole structure more compact and lighter.

In addition, when the shielded cable 10 having the waterproofing structure 11 according to the first embodiment and the shielded cable 10' having the waterproofing structure 11 according to the second embodiment are bundled and used as a wire harness for power feeding, wiring, and the like of various vehicles such as an HEV and an EV, it is possible to reduce a space for wiring to the vehicle side to save space.

In the waterproofing structure 11 of the shielded cable 10' according to the second embodiment, the two coated cables 12 are shielded by covering them collectively with the braided wire 13, but the number of the coated cables 12 shielded with the braided wire 13 is not limited to two, and may be three or more.

Third Embodiment

Figure 7:
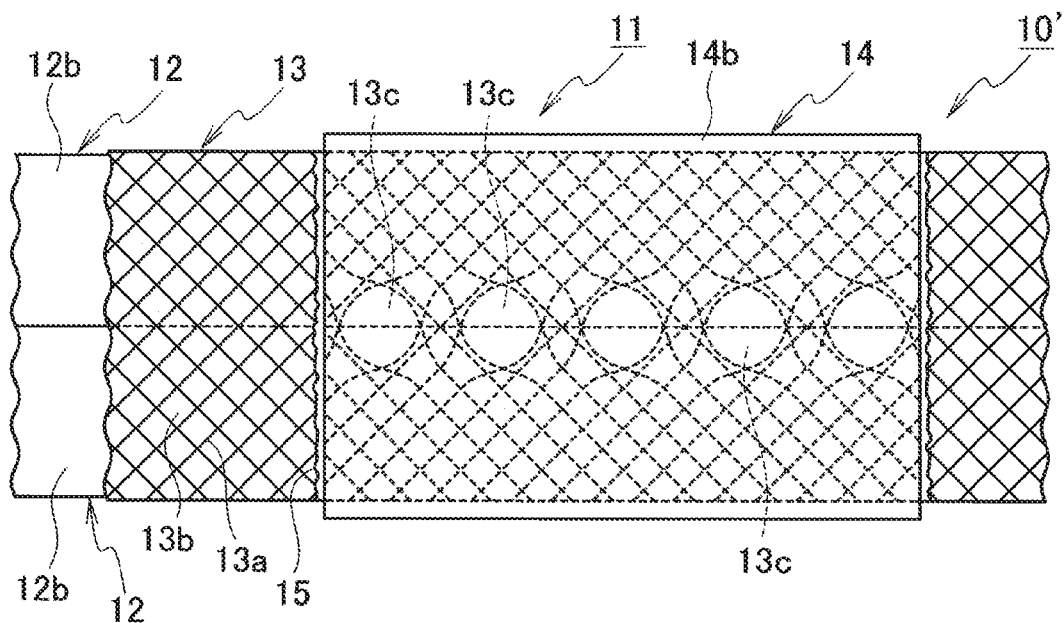
FIG. 7 is a plan view of a main portion of a waterproofing structure for a shielded cable according to a third embodiment.
Figure 8:
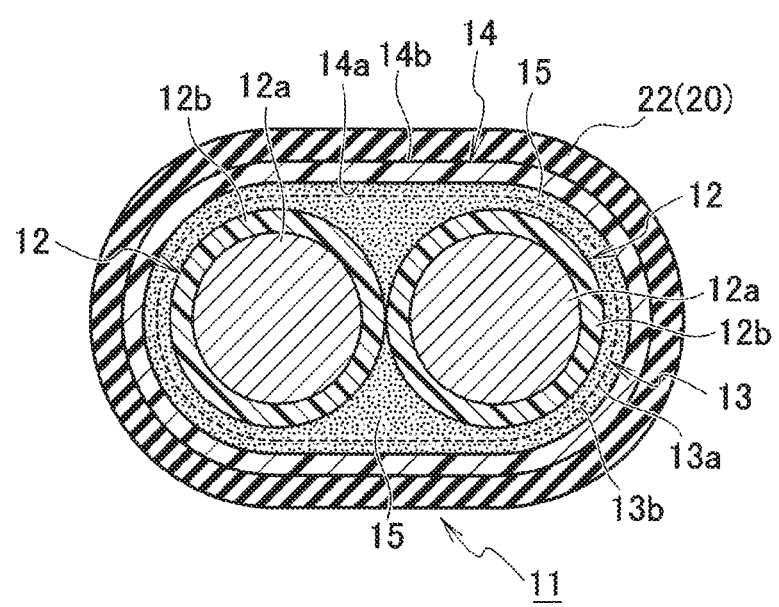
FIG. 8 is a cross-sectional view of the waterproofing structure for the shielded cable in FIG. 7.

With reference to FIGS. 7 and 8, a waterproofing structure for a shielded cable according to a third embodiment will be described.

In a waterproofing structure 11 for a shielded cable 10' according to the third embodiment, as illustrated in FIG. 7, an adhesive 15 permeates into gaps between two coated cables 12 through widened gaps 13c between the strands 13a of a braided wire 13, which is a big difference from the second embodiment. Since other components of the waterproofing structure 11 for the shielded cable 10' according to the third embodiment are the same as those of the second embodiment, the same components are denoted by the same reference numerals, and a detailed description thereof is omitted.

In the third embodiment, the gaps between the two coated cables 12 covered with the braided wire 13 can be reliably filled with the adhesive 15 pressed into the braided wire 13 by heat shrinkage of the heat shrinkable tube 14 through the widened gaps 13c between the strands 13a of the braided wire 13. Thus, the adhesive 15 can be pushed into and fill more reliably the gaps 13b between the plurality of strands 13a of the braided wire 13 in the entire region of a waterproofed portion, the widened gaps 13c between the strands 13a of the braided wire 13, the gap between the coated cables 12 and the plurality of strands 13a of the braided wire 13, and the gaps between the two coated cables 12 by the heat shrinkage of the heat shrinkable tube 14. Therefore, the waterproofing structure 11 for the shielded cable 10' according to the third embodiment enables to reduce the number of parts and man-hours to reduce cost, and to make the whole structure more compact and lighter similarly to the second embodiment.

In the third embodiment, the two coated cables 12 are shielded by covering them collectively with the braided wire 13, but the number of the coated cables 12 shielded with the braided wire 13 is not limited to two, and may be three or more, or may be one.

Fourth Embodiment

Figure 9:
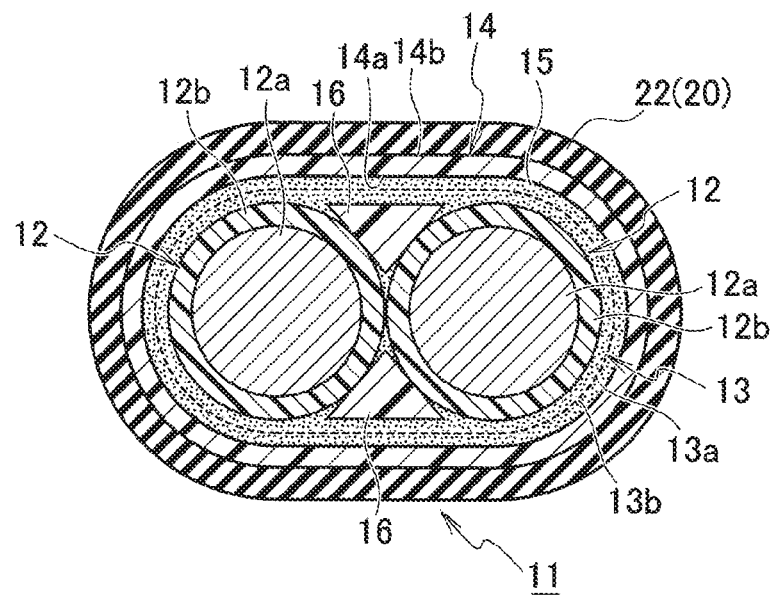
FIG. 9 is a cross-sectional view of a main portion of a waterproofing structure for a shielded cable according to a fourth embodiment.
Figure 10:
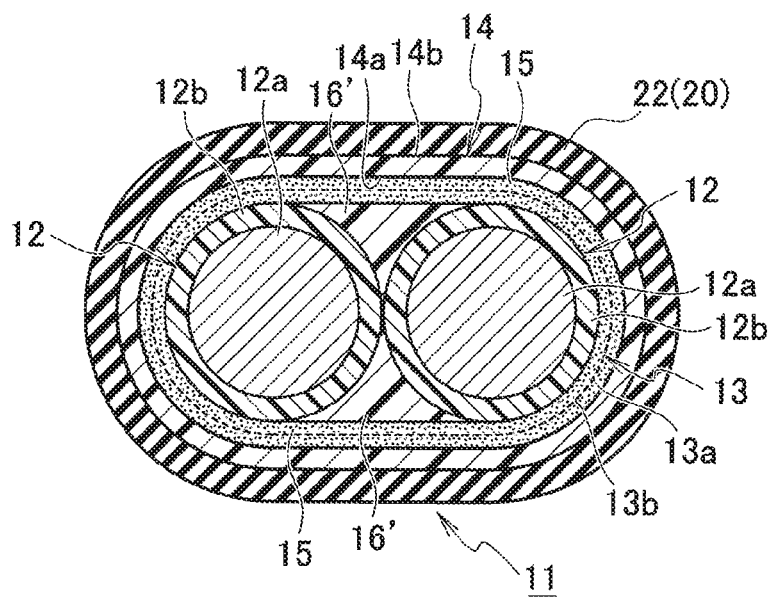
FIG. 10 is a cross-sectional view of the waterproofing structure for the shielded cable in FIG. 9.
Figure 11:
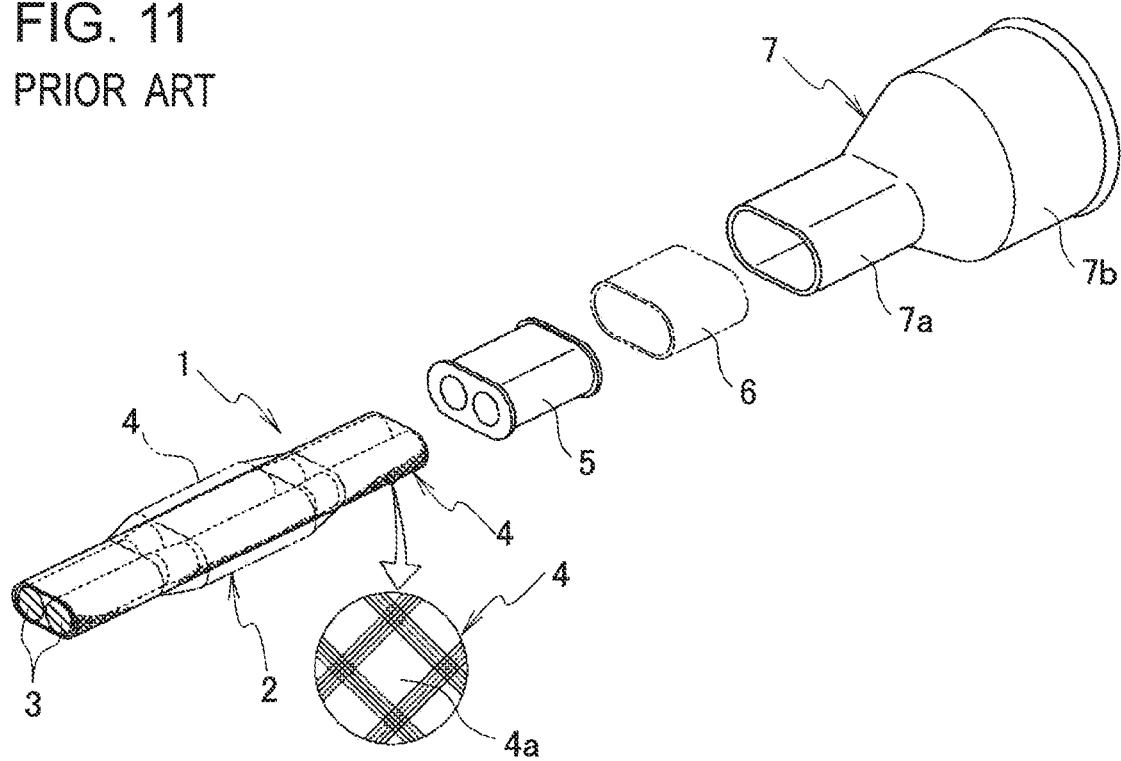
FIG. 11 is an exploded perspective view of a conventional waterproofing structure for a shielded cable.
Figure 12:
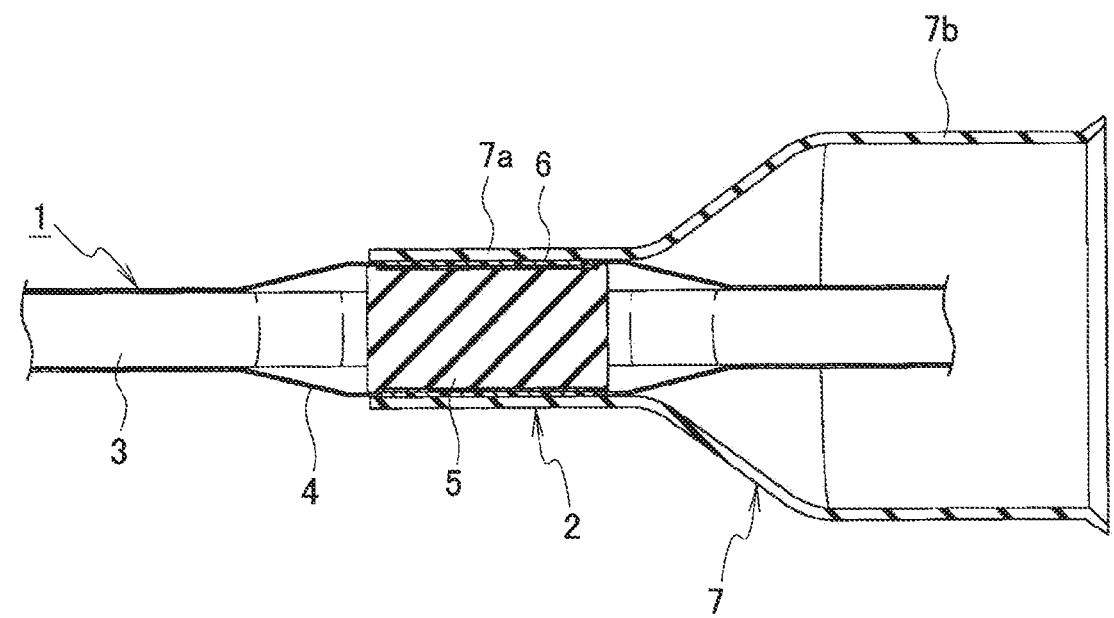
FIG. 12 is a cross-sectional view of the conventional waterproofing structure for the shielded cable.

With reference to FIGS. 9 and 10, a waterproofing structure tier a shielded cable according to a fourth embodiment will be described.

In a waterproofing structure 11 for a shielded cable 10' according to the fourth embodiment, as illustrated in FIG. 9, two triangular bar-shaped thermoplastic resins 16 are disposed as waterproofing fillers in gaps between two coated cables 12 covered with a braided wire 13, and a thermoplastic resin 16' melted by heating fills the gaps between the two coated cables 12, which is a difference from the second embodiment. Since other components of the fourth embodiment are the same as those of the second embodiment, the same components are denoted by the same reference numerals, and a detailed description thereof is omitted.

In the fourth embodiment, the adhesive 15 is pushed into and fills reliably the gaps 13b between the plurality of strands 13a of the braided wire 13 in the entire region of a waterproofed portion and the gap between the coated cables 12 and the plurality of strands 13a of the braided wire 13 by the heat shrinkage of the heat shrinkable tube 14, and the thermoplastic resin 16' melted by heating fills the gaps between the two coated cables 12 in the entire region of the waterproofed portion. Thus, the gaps 13b between the plurality of strands 13a of the braided wire 13 in the entire region of the waterproofed portion, the gap between the coated cables 12 and the plurality of strands 13a of the braided wire 13, and the gaps between the two coated cables 12 can be reliably filled with the adhesive 15 applied to the inner circumferential surface 14a side of the heat shrinkable tube 14 and the melted thermoplastic resin 16'. Therefore, the waterproofing structure 11 for the shielded cable 10' according to the fourth embodiment enables to reduce the number of parts and man-hours to reduce cost, and to make the whole structure more compact and lighter similarly to the second embodiment.

In the fourth embodiment, the triangular bar-shaped thermoplastic resins 16 are disposed as waterproofing fillers in the gaps between the two coated cables 12, but a granular thermoplastic resin may fill the gaps between the two coated cables 12. As the triangular bar-shaped thermoplastic resin 16 or the granular thermoplastic resin, adhesive that melts by heating to flow into the gaps and solidifies by cooling to stick the surrounding parts to each other (e.g. "Product Name: Hot Melt Adhesive" manufactured by Cemedine Co., Ltd.) may be used. In addition, the number of the coated cables 12 shielded by the braided wire 13 is not limited to two, and may be three or more.

In addition, in the first to fourth embodiments, adhesive is used as a waterproofing filler, but a waterproofing filler is not limited to adhesive, and furthermore, the rubber grommet 20 is used as a waterproofing member, but a waterproofing member is not limited to a rubber grommet.

What is claimed is:

1. A shielded-cable waterproofing structure, comprising:
   a shielded cable including one or more cables and a braided wire serving as a shielding member and covering the cables;
   a waterproofing member covering a waterproofed portion of the braided wire; and
   a heat shrinkable tube including a waterproofing filler disposed to cover the waterproofed portion of the braided wire, wherein
   the waterproofing filler pushed into the braided wire by heat shrinkage of the heat shrinkable tube fills gaps between a plurality of strands of the braided wire in a region of the waterproofed portion and an entire region of a gap between an inner circumferential surface of the heat shrinkable tube facing the braided wire and an outer circumferential surface of the cables, and
   a space between an outer circumferential surface of the heat shrinkable tube and a part of an inner circumferential surface of the waterproofing member is blocked without any gap in a circumferential direction along a majority of the length of the heat shrinkable tube.

2. The shielded-cable waterproofing structure according to claim 1, wherein
   the braided wire collectively covers the cables, and
   a gap between the cables is filled with the waterproofing filler.

3. The shielded-cable waterproofing structure according to claim 1, wherein the shielded cable has a sheathless structure in which an outside of the braided wire is not covered with an insulating sheath.

4. The shielded-cable waterproofing structure according to claim 2, wherein the waterproofing filler permeates and fills a gap between the plurality of cables through a widened gap between strands of the braided wire.

5. The shielded-cable waterproofing structure according to claim 2, wherein a gap between the plurality of cables is filled with a bar-shaped thermoplastic resin serving as the waterproofing filler.

6. A shielded-cable waterproofing method, comprising:
   when covering a waterproofed portion of a shielded cable including one or more cables and a braided wire serving as a shielding member and covering the cables, with a waterproofing member;
   covering the braided wire in the waterproofed portion on the shielded cable with a heat shrinkable tube including a waterproofing filler;
   filling gaps between a plurality of strands of the braided wire in a region of the waterproofed portion and an entire region of a gap between an inner circumferential surface of the heat shrinkable tube facing the braided wire and an outer circumferential surface of the cables with the waterproofing filler by pushing the waterproofing filler into the braided wire by heating the heat shrinkable tube to shrink; and
   bringing an outer surface of the heat shrinkable tube in the waterproofed portion filled with the waterproofing filler into close contact with a part of an inner surface of the waterproofing member without any gap in a circumferential direction along a majority of the length of the heat shrinkable tube.

7. The shielded-cable waterproofing method according to claim 6, further comprising:
   collectively covering the cables with the braided wire, and filling a gap between the cables with the waterproofing filler permeating through a widened gap between strands of the braided wire.

* * * * *